United States Patent [19]

McMinn

[11] Patent Number: 5,032,856
[45] Date of Patent: Jul. 16, 1991

[54] MOUNT FOR PINHOLE LENS CAMERA

[76] Inventor: William O. McMinn, 2712 Garfield Ave., Silver Spring, Md. 20910

[21] Appl. No.: 480,569

[22] Filed: Feb. 15, 1990

[51] Int. Cl.⁵ .............................................. G03B 29/00
[52] U.S. Cl. ........................................ 354/81; 358/108
[58] Field of Search .................. 354/63, 81, 293, 295; 352/243; 358/99, 100, 108

[56] References Cited

U.S. PATENT DOCUMENTS

| | | | |
|---|---|---|---|
| 3,482,037 | 12/1969 | Brown et al. ........................ | 358/108 |
| 4,346,404 | 8/1982 | Gantenbrink ......................... | 358/99 |
| 4,350,419 | 9/1982 | Bowen ................................. | 354/295 X |

*Primary Examiner*—Brian W. Brown
*Attorney, Agent, or Firm*—Evenson, Wands, Edwards, Lenahan & McKeown

[57] ABSTRACT

A mount for a pinhole lens camera includes a plate for mounting to a wall or cabinet and an approximately hemispherical shell rotatable relative to the plate. The shell is held at a fixed rotational position relative to the plate with clamp or the like. The camera is held in a tube assembly which is adjustable along a radial slot in the shell in a manner that the entrance pupil of the camera lens, in front of the lens, remains fixed at a point on the center normal line of the plate when the direction of the camera axis is changed. The tube assembly is fixed in position in the slot by clamping with a washer and clamping nut.

17 Claims, 5 Drawing Sheets

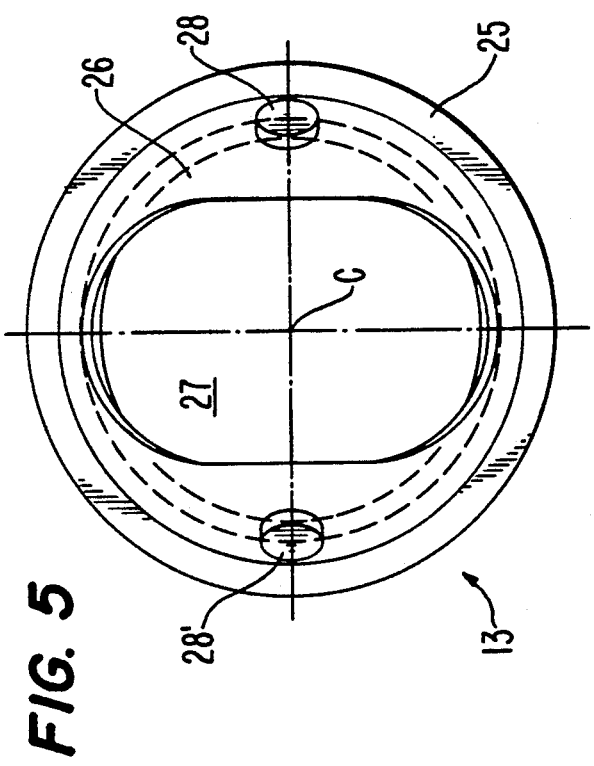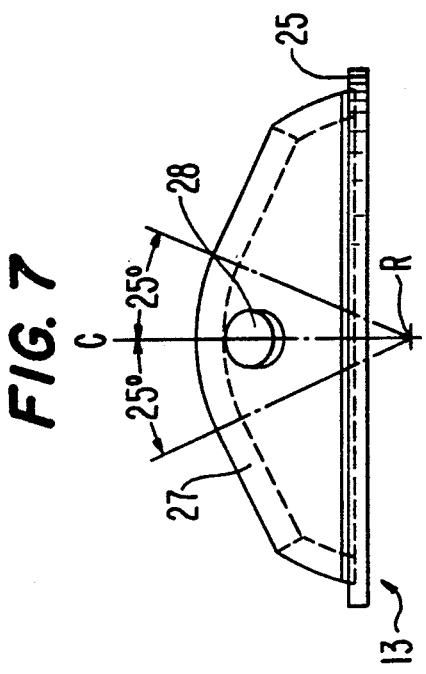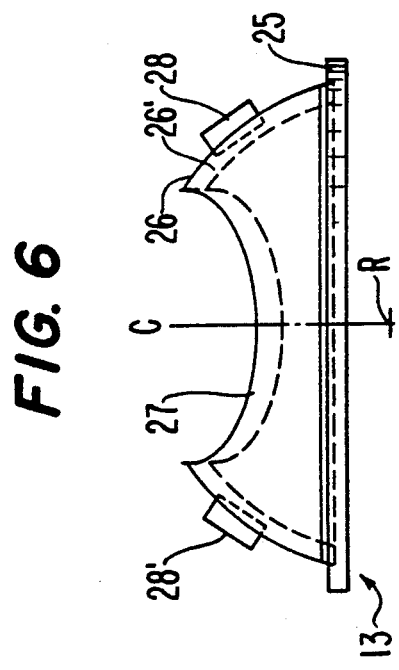

MOUNT FOR PINHOLE LENS CAMERA

BACKGROUND OF THE INVENTION

The present invention relates to a mount for a pinhole lens camera and, more particularly, to an improved wall or cabinet mount which provides for greater ease, speed and accuracy of installation of the mount while allowing for rapid and accurate pointing of the camera axis.

Pinhole lens cameras are used extensively by governmental authorities during undercover investigations or in investigations which must be conducted secretly or unobtrusively. Typically, a small hole is drilled through a wall or cabinet. The lens of a pinhole lens camera has the entrance pupil in front of the lens rather than inside the lens, thus allowing for positioning the pupil at a hole without loss of optical aperture or field of view except as the hole limits the aperture. Walls for which the present invention is applicable may be up to $\frac{1}{8}$-inch thick, and can take the form of a cabinet, a thin wall or an electrical box. If the mount is to be used on a thicker wall as, for example, $\frac{1}{2}$-inch gypsum drywall, the wall section for the mount must be thinned to $\frac{1}{8}$-inch.

Mounts designed especially for pinhole lens cameras, as regards the desired conditions of positioning the lens entrance pupil at the wall aperture, and to speak more rigorously, positioning at the opening of the wall aperture into the viewed space, and maintenance of this position during camera pointing adjustment, have not existed prior to this invention. Various holding arrangements have been employed which lack a positive positioning scheme, or even design consideration of the precise location of the entrance pupil. Pointing is usually restricted to the perpendicular direction to the wall, and pointing by rotation of the optical axis about a point in the wall aperture, which is the acceptable scheme, has not been employed. Failure to incorporate these design considerations in pinhole lens camera mounts has lead to loss of optical aperture due to misalignment of pupil and hole in the initial or the adjusted installation of the camera, and tedium in applying angular adjustment without altering the positional adjustment.

SUMMARY OF THE INVENTION

Accordingly, it is the object of the present invention to overcome the problems and disadvantages encountered in prior art wall and cabinet mounts for pinhole lens cameras.

In particular, it is an object of the present invention to provide a simplified wall or cabinet mount which assures that the camera lens entrance pupil will fall at the wall aperture on the side of the viewed space, provides a range of pointing the camera axis and assures that the entrance pupil location is not disturbed when pointing adjustment is applied. Additional objects of the invention are ease of installation of the mount, ease of installation of the camera in the mount, ease of pointing and smallness of the mount relative to camera size, as befits its application to concealment in small spaces.

The foregoing objects have been achieved by use of a wall plate which can be fixed to the wall with epoxy or double face tape, the camera mount and a conventional video camera such as a PULNIX CCD camera fitted with a pinhole lens.

One presently preferred embodiment of the present invention utilizes a wall plate which is fixed to the wall, say with epoxy, in alignment with the wall aperture, a camera holding tube assembly, a shell assembly adapted for holding and orienting the camera holding tube assembly, and a washer and clamping nut to secure the camera holding tube assembly to the shell assembly. The shell assembly is rotatable 360° in the wall plate about its centerline which coincides with the perpendicular at the center of the wall plate. Displacement of the camera holding tube assembly in a slot in the shell assembly moves the camera holding tube assembly transversely to the centerline. Rotation of the shell assembly and displacement of the camera holding tube assembly in the slot allow the camera axis to be positioned anywhere in an imaginary cone with apex in the wall aperture and axis perpendicular to the wall and having a half-angle value of 25°. The rotational position of the shell assembly and the position of the camera holding tube assembly are secured with clamps.

The foregoing system provides advantages unavailable with prior art mounts which did not provide a standard way of mounting and required miscellaneous hardware. The advantages are compactness, simple construction, ease of installation and optimum means of positioning and securing the camera.

BRIEF DESCRIPTION OF THE DRAWINGS

These and other features, objects and advantages of the present invention will become more apparent from the following detailed description of a presently preferred embodiment when taken in conjunction with the accompanying drawings wherein:

FIG. 5 is a plan view of the shell assembly 13 shown in FIG. 1;

FIG. 6 is a side elevational view of the shell assembly shown in FIG. 5 along the direction of the slot;

FIG. 7 is a side elevational view orthogonal to the side elevational view of FIG. 6;

DETAILED DESCRIPTION OF THE INVENTION

Figure 1:
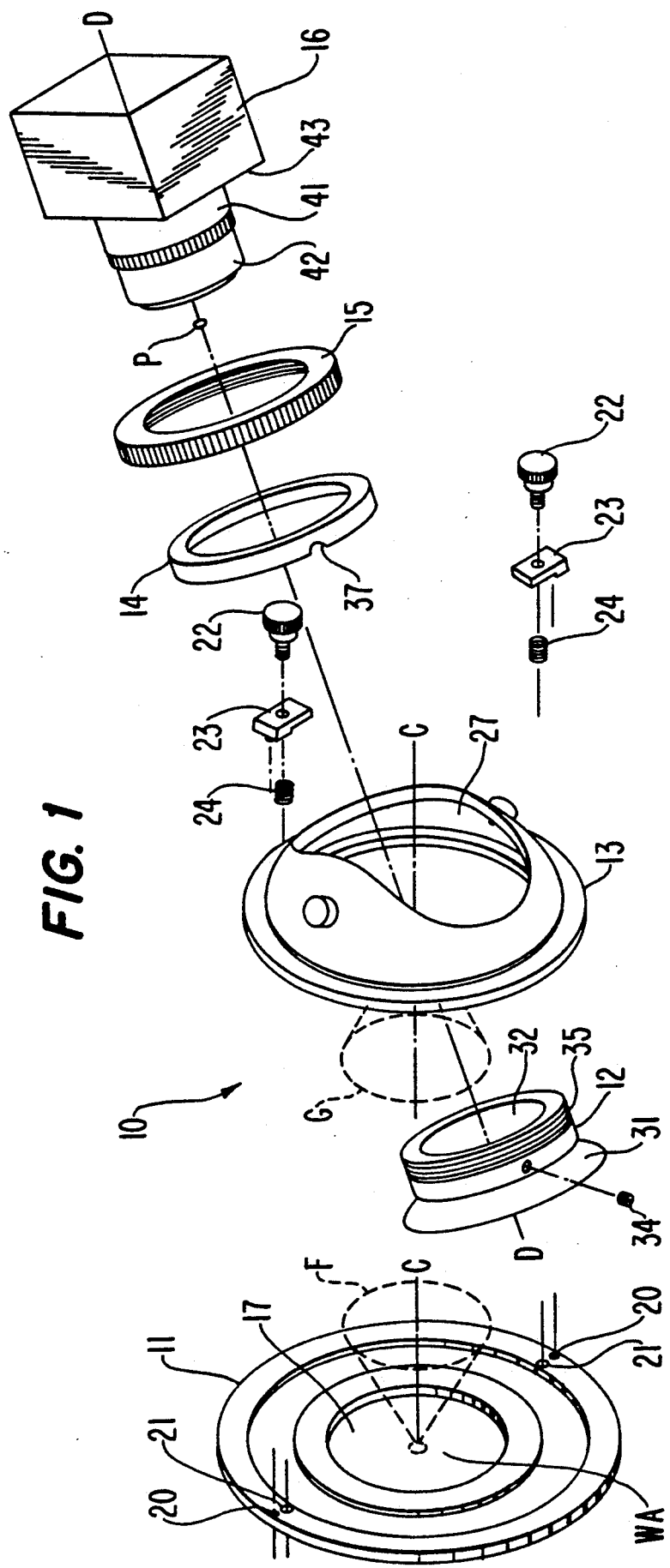
FIG. 1 is an exploded perspective view of the mount assembly in accordance with the present invention.

Referring now to the drawings, and in particular, to FIG. 1, the mount assembly is designated generally by the numeral 10. The assembly 10 comprises an annular wall plate 11, a camera holding tube assembly 12, a rotatable shell assembly 13, a washer 14, and a clamping nut 15. FIG. 1 shows, additionally, a camera 16, not a part of the invention, such as a known Pulnix/Goldinar video camera used in surveillance and being of the pinhole lens type wherein the lens entrance pupil P (FIG. 1) is in front of the camera 16.

Figure 2:
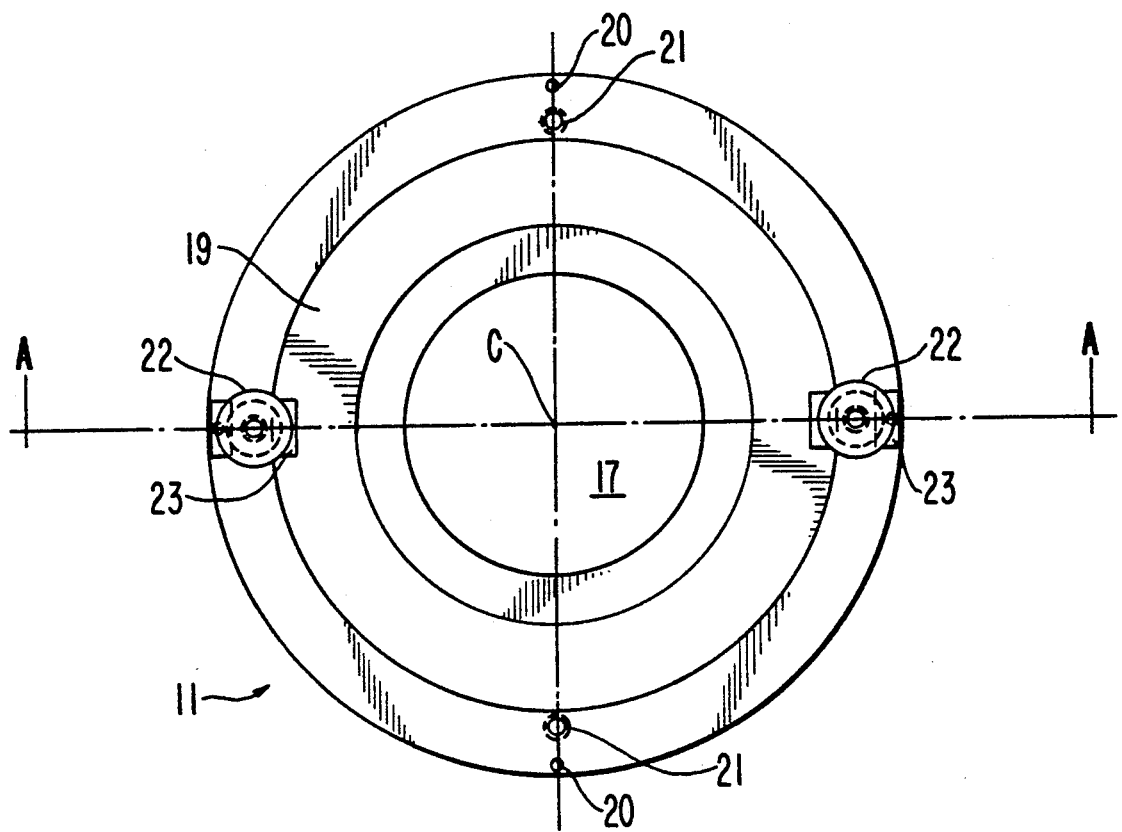
FIG. 2 is a plan view of the wall plate with clamps mounted thereon.
Figure 3:
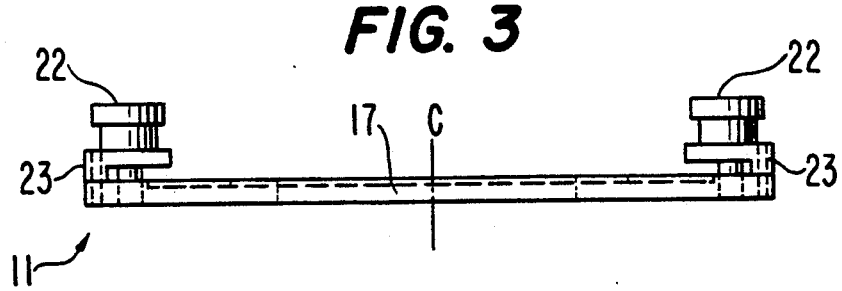
FIG. 3 is a side view of the wall plate of FIG. 2.
Figure 4:
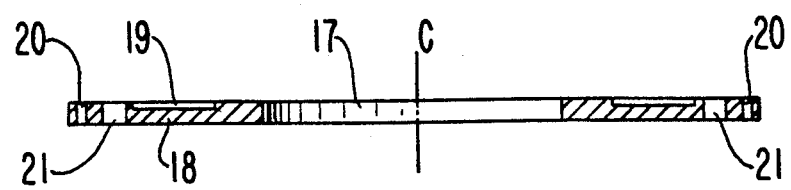
FIG. 4 is a cross-sectional view taken along the line A—A of FIG. 2 omitting the clamps and thumbscrews shown in FIG. 2.

The annular wall plate 11 is shown in more detail in FIGS. 2–4. The wall plate 11, as seen in cross-section in FIG. 4, has a central aperture 17 and a U-shaped web portion 18 which defines a recessed land area 19 for receiving a base or flat annular member 25 of the shell assembly 13 in a rotatable manner as hereinafter described. Threaded holes 21 are provided around the periphery of the web portion 18, and in the illustrated embodiment, are four in number, although only two need be provided in other instances. These holes receive the thumbscrews 22, which by acting on the clamps 23 secure the shell assembly 13 to the wall plate 11 at any desired position selected by rotation of the shell assembly about a central axis C (FIGS. 1, 3 and 6). Smooth holes 20 situated radially outward from the holes 21 are sockets for heel pins on the clamps which assure proper orientation of the clamps. Compression springs 24 (FIG. 1) under the clamps lift the clamps when the thumbscrews are loosened so that the shell assembly 13 may be conveniently inserted in or be removed from the wall plate.

The shell assembly 13 shown in FIGS. 5–7 comprises a flat annular member 25 whose diameter is sized to fit securely but rotatably within the recessed land area 19 of the wall plate 11. An approximately hemispherical thin wall portion 26, 26' projects from the annular member 25. This portion has spherically shaped surfaces whose common spherical center lies on the centerline C at a point R which will fall in the wall aperture on the side of the viewed space. The slot 27 in the shell assembly is designed to receive the tube portion 30 (FIG. 8) of the camera mounting tube assembly 12. The camera mounting tube assembly 12 is secured to the shell assembly by means of the washer and clamping nut described hereinafter. Knurled buttons 28 on the shell assembly are aids for rotating the shell assembly.

Figure 8:
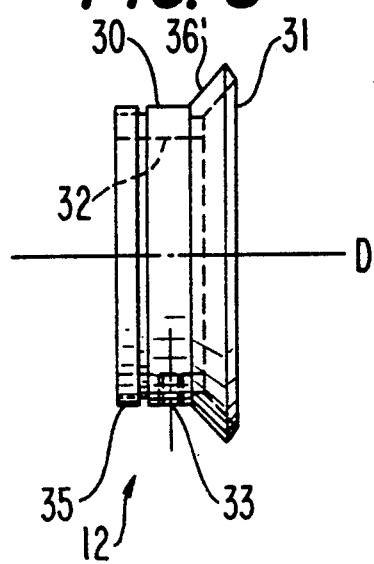
FIGS. 8 and 9 are respectively side and plan views of the camera holding tube assembly 12 shown in FIG. 1.
Figure 9:
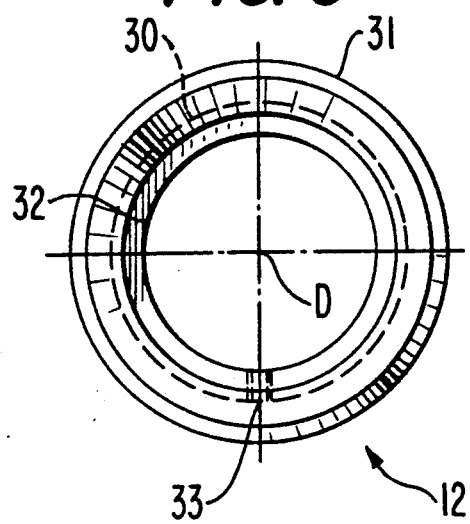

FIGS. 8 and 9 show the camera holding tube assembly 12 comprising a tube portion 30 and a flange 31. The inside of the tube 30 is a smooth cylindrical bore 32 into which the front section 41 (FIGS. 1 and 14) of the camera fits. The holding tube 30 passes closely but freely through the slot 27 (FIG. 5) in the shell assembly when it is introduced from the inside of the shell assembly. The flange 31 has an outer surface 36' of spherical shape which fits complementarily against the inner surface 26' (FIG. 6) of the shell assembly when the holding tube assembly is fitted to the shell assembly. The complementary fit of the flange against the inner surface of the shell assembly orients the holding tube axis D (FIGS. 1 and 8) to pass through the point R (FIGS. 6,7) at the common center of the surfaces 26, 26' of the shell assembly. A hole 33 tapped radially through the wall of the holding tube 30 receives a set screw 34 (FIG. 1) which secures the camera 16 in the holding tube assembly. The free end 35 of the holding tube 30 is threaded to engage a female thread in the clamping nut 15.

Figure 10:
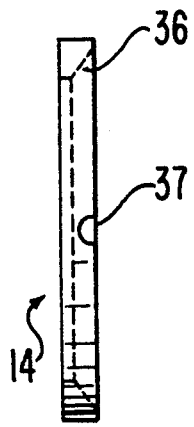
FIGS. 10 and 11 are respectively side and plan views of the washer 14 shown in FIG. 1.
Figure 11:
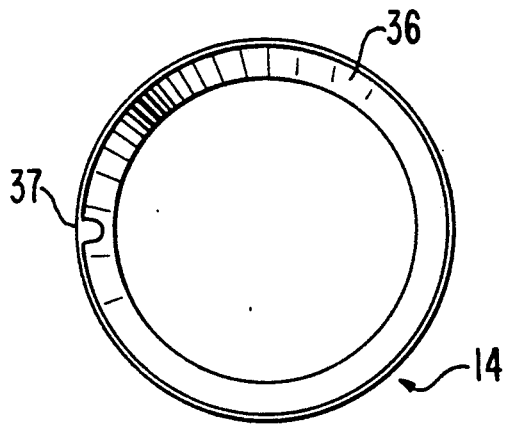

The washer 14 shown in detail in FIGS. 10 and 11 fits around the portion of the holding tube 30 (FIG. 8) which projects on the outside of the shell assembly 13. The surface 36 of the washer which faces the shell assembly 13 has a spherical shape complementary to the outside surface 26 (FIGS. 5 and 6) of the shell assembly. The opposite face of the washer is flat and this side of the washer fits into a recess in the face of the clamping nut 15 (FIG. 12) when the nut is threaded onto the end 35 (FIG. 8) of the camera holding tube assembly 12. A notch 37 in the edge of the washer allows access of a hex key to the set screw 34 (FIG. 1) in the camera holding tube assembly 12.

Figure 12:
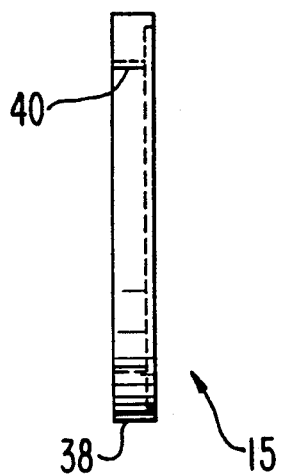
FIGS. 12 and 13 are respectively side and plan views of the clamping nut 15 shown in FIG. 1.
Figure 13:
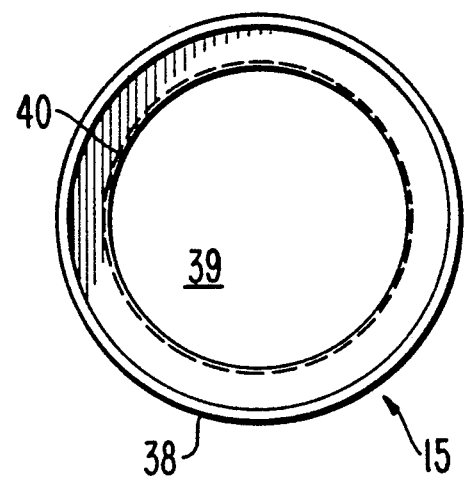

The clamping nut 15 shown in FIGS. 12 and 13 is provided with a knurled outer circumference 38 for better gripping. The central aperture 39 has an inside thread 40 to engage with the threaded portion 35 (FIG. 8) of the camera holding tube assembly 12.

Figure 14:
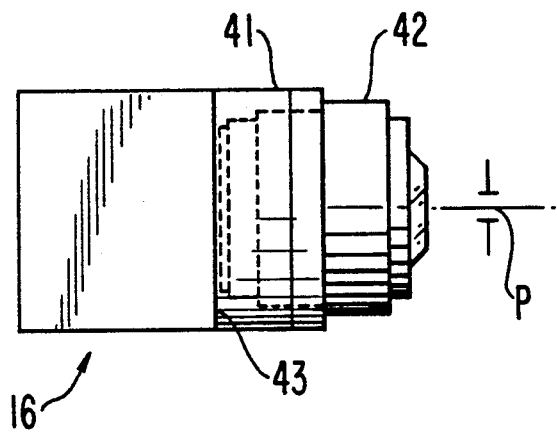
FIG. 14 is a side elevational view of the camera such as a Pulnix/Goldinar camera of conventional construction used in the mount assembly of FIG. 1.
Figure 15:
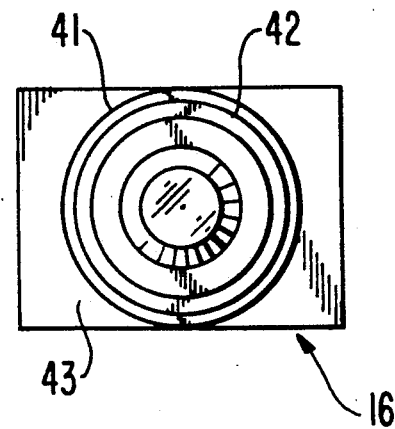
FIG. 15 is a front view of the camera shown in FIG. 14.

The pinhole lens camera 16 is shown in profile in FIG. 14 and is a video camera of generally known construction. To give some idea, however, of the relative size of the camera, its length is less than 2" from the front of the lens to the back of the camera. The entrance pupil P (FIGS. 1 and 14) in the case of the Goldinar lens has a diameter of 0.15 inches and is located 0.30 inches in front of the lens. The lens 42 is threaded into the front portion 41 (FIGS. 1 and 14) which is of cylindrical shape. This part 41 of the camera is inserted in the camera mounting tube assembly 12 and secured by means of the set screw 34 (FIG. 1).

In use, the present invention and the pinhole lens camera constitute a system with three components: the camera, the wall plate and a unit made by assembling the camera mounting tube assembly 12, the washer 14 and the clamping nut 15 to the shell assembly 13. This assembly is called hereinafter the mount unit.

In use, the wall plate 11 is attached to a wall or a cabinet (not shown) by conventional means such as epoxy or double face tape. The wall aperture (FIG. 1) may be drilled either before or after the wall plate 11 is attached to the wall. In either case, means must be applied to assure that the wall aperture will be at the center of the circular aperture 17 (FIGS. 1 and 2) of the wall plate. An alignment tool (not shown) is available for this purpose, but scale measurements alone are usually sufficient since the entrance pupil of the camera lens is usually appreciably larger than the wall aperture used. After the wall plate 11 is attached to the wall, it is fitted with the biasing springs 24, the clamps 23 and the thumbscrews 22.

The camera 16 is placed in the mount unit so that the face 43 of the camera body is against the end of the mounting tube 30 (FIG. 8) and the camera is secured in the mounting tube by tightening the set screw 34. This placement of the camera in the mount unit assures, according to design, that the entrance pupil P of the camera lens will fall at the spherical center R (FIG. 7) of the surfaces 26 and 26' of the shell assembly 13.

The mount unit with the camera secured in the mounting tube assembly 12 is assembled to the wall plate by a lateral motion which carries the edge of the shell assembly 13 under the clamps 23 on the wall plate 11, so that the annular member 25 (FIG. 6) of the shell assembly may fit down into the recessed land area 19 (FIG. 4) of the wall plate 11. When the mount unit is fitted to the wall plate 11, it may be secured in any rotational position by means of the clamps 23 and thumbscrews 22.

In an installation such as has just been described, the camera axis and the axis of the camera holding tube assembly coincide in a line D (FIG. 1) which passes through the center of the wall aperture WA and the center of the lens entrance pupil P will be positioned at the wall aperture WA. These conditions persist when the position of the camera holding tube assembly 13 in the slot 27 (FIG. 5) in the shell assembly 13 is adjusted or the shell assembly 13 is rotated in the wall plate 11. With such adjustments the entrance pupil of the camera lens remains fixed in the wall aperture WA while the direction of the camera axis D projected into the viewed space is changed. The conical surfaces F and G in dotted lines in FIG. 1 indicate the limits and the range of the camera axis directions.

The camera 16 used with this invention is usually a video camera requiring certain external cables and a video monitor. The monitor permits easy, precise and fast adjustments of the mount to be made. After rotational adjustment of the shell assembly 12 in the wall plate 11 the shell assembly is secured by means of the clamps 23 and the thumbscrews 22. After adjustment of the position of the camera holding tube assembly 12 in the shell assembly 13, the camera holding tube assembly is secured to the shell assembly by tightening the clamping nut 15. Rotation adjustment of the shell assembly produces a, usually undesirable, tilt of the video image on the monitor. Such tilt is easily eliminated by loosening the clamping nut 15 and counter rotating the camera mounting tube assembly 12 in the shell assembly 13 a sufficient amount and then retightening the clamping nut. The camera is then ready to begin surveillance operations with the investigator and monitor and recording equipment in a near or a remote location.

While I have shown and described a specific embodiment in accordance with the present invention, it is to be clearly understood that the same is susceptible to changes and modifications without departure from the scope of the present invention. Therefore, I do not intend to be limited to the details shown and described herein but intend to cover all such changes and modifications as are encompassed by the scope of the appended claims.

I claim:

1. A mount for a pinhole lens camera, comprising:
a plate adapted to be secured to a surface having a small opening for viewing;
a shell assembly comprising an approximately hemispherical shell fixed symmetrically to a flat annular flange and adapted to fit on and be rotatable with respect to said plate and having an opening in a wall of the shell elongated along a meridian of a surface of the shell for adjusting a direction of an optical axis of the camera relative to a centerline of said shell assembly;
means for selectively fixing said shell assembly at a desired rotational position on said plate;
a tube assembly which fits in said shell wall opening and is adapted to hold the camera by a lens mounting barrel of the camera such that the optical axis of the camera passes through a common spherical center of inner and outer surfaces of said shell and an entrance pupil of the pinhole lens is at the common spherical center; and
means for securing the tube assembly at a desired position in said slot.

2. The mount according to claim 1, wherein said plate is an annular member having a first surface adapted to be fixed to the surface with the small opening such that the plate has a center substantially coincident with a center of the small opening and a second surface containing a shallow recessed land opposite to the first surface into which the flat annular flange of said shell assembly is received so that centerlines of said plate and of said shell assembly coincide, and the shell assembly is rotatable on the land.

3. The mount according to claim 1, wherein said approximately hemispherical shell has spherically shaped inner and outer surfaces having a common spherical center which lies on the centerline of the shell assembly.

4. The mount according to claim 3, wherein the common spherical center of the inner and outer surfaces of said approximately hemispherical shell will fall beyond said plate, when said shell assembly is received on said plate, at a desired location for the entrance pupil of an objective lens of the camera in the small opening.

5. The mount according to claim 1, wherein said shell wall opening extends to at least one side of the centerline of said shell assembly to an extent that an axis of said tube assembly when fitted in the shell wall opening may be rotated to about 25° from the centerline, said rotation of the axis of the tube assembly being about the common spherical center of the inner and outer spherically shaped surfaces of the hemispherical shell.

6. The mount according to claim 1, wherein said means for fixing the shell assembly at a desired rotational position on said plate comprise clamps fixed to said plate and adapted to abut a surface of the flange of said shell.

7. The mount according to claim 1, wherein said tube assembly has a flange affixed at one end thereof having an outer diameter greater than a width of said opening in the shell wall, and having a surface adjacent to said tube in the form of a portion of a spherical surface which will complementarily fit the inner surface of said shell when said tube assembly is fitted to the shell assembly.

8. The mount according to claim 1, wherein the means for securing the tube in the slot comprises a washer and a clamping ring operatively associated with said tube.

9. The mount according to claim 8, wherein said washer has a surface shaped to fit complementarily on an outer spherically shaped surface of said shell.

10. The mount according to claim 8, wherein said washer has an inner diameter suitable for fitting closely on said tube, and an outer diameter greater than a width of the shell wall opening slot in said hemispherical shell.

11. The mount according to claim 8, wherein said clamping ring and said tube are operatively associated via a threaded connection.

12. The mount according to claim 1, wherein said tube is adapted to hold the camera in the manner that the entrance pupil of a lens of the camera falls at the common spherical center of surfaces of said hemispherical shell.

13. In a mount for a pinhole lens camera adapted to be placed against a surface with a small aperture for viewing, improvements comprising a thin-wall shell assembly having a centerline which passes through the aperture for viewing and surfaces which are portions of concentric spheres with a spherical center at the aperture and having a slot which permits holding the pinhole lens camera with a tube assembly so that an entrance pupil of a lens of the camera is at the aperture and an optical axis of the camera is directed through the aperture at any angle up to 25° from the centerline, and means to rotate and fix the shell assembly at any position about its centerline.

14. In the mounting according to claim 13, said means to rotate and fix comprising an annular plate having a first surface adapted to be fixed to another surface which contains the small aperture such that a center of the plate is substantially coincident with a center of the small aperture and having a second surface adapted to receive the shell assembly thereon, and clamping devices disposed around a periphery of the plate for engaging a clamping surface on the shell assembly.

15. In the mount according to claim 13, means for fixing the tube in the slot at any desired position comprising a flange on the tube which is complementarily fitted to an inside surface of the shell assembly, a washer placed on the tube and complementarily fitting an outside surface of the shell assembly and a clamping nut threadably engaged with the tube to effectively fix the tube to the shell assembly by clamping a wall of the shell assembly between the washer and the flange on the tube.

16. The mount according to claim 1, wherein the means for securing said tube assembly in said opening in said shell wall comprise a flange of said tube assembly which fits against the inner surface of said shell, a washer with an outer diameter greater than a width of said opening in said shell wall adapted to fit around said tube assembly and to rest in a spherically complementary manner on the outer surface of said shell, and a clamping ring operatively associated with said tube assembly via a threaded connection for the purpose of driving said washer against said shell, said means permitting the wall of said shell to be clamped between said washer and the flange of said tube assembly; said means for securing said tube assembly effectively assuring that a axis of said tube assembly will pass through the common center of curvature of the spherically shaped inner and outer surfaces of said shell.

17. The mount according to claim 1, wherein said tube assembly is adapted to hold the camera by a lens mounting barrel on a body of the camera so that the optical axis coincides with an axis of said tube assembly while the entrance pupil is positioned at the common spherical center.

* * * * *